May 4, 1926.

W. R. FOX

POWER PRESS

Filed June 12, 1924   2 Sheets-Sheet 1

1,583,227

Inventor
William R. Fox
Attorney

May 4, 1926.

W. R. FOX

POWER PRESS

Filed June 12, 1924

Inventor
William R. Fox

Attorney

Patented May 4, 1926.

1,583,227

UNITED STATES PATENT OFFICE.

WILLIAM R. FOX, OF JACKSON, MICHIGAN.

POWER PRESS.

Application filed June 12, 1924. Serial No. 719,635.

*To all whom it may concern:*

Be it known that I, WILLIAM R. Fox, a citizen of the United States, and resident of Jackson, in the county of Jackson and State of Michigan, have invented certain new and useful Improvements in Power Presses, of which the following is a specification.

The invention relates to the general form of power press disclosed in application for Letters Patent of the United States Serial No. 691,280, filed by me Feb. 7, 1924 in which the ram has reciprocating but no rotary movement. In the present case the ram is provided with a coarse screw thread engaged by a nut rotated by power mechanism, the screw ram being held against rotary movement so as not to exert a turning force upon the work piece and to avoid the necessity of a special swivelled nose piece on the ram.

In the present case it is sufficient to illustrate the head portion of the press and the parts mounted thereon.

In the drawings—

Figure 1:
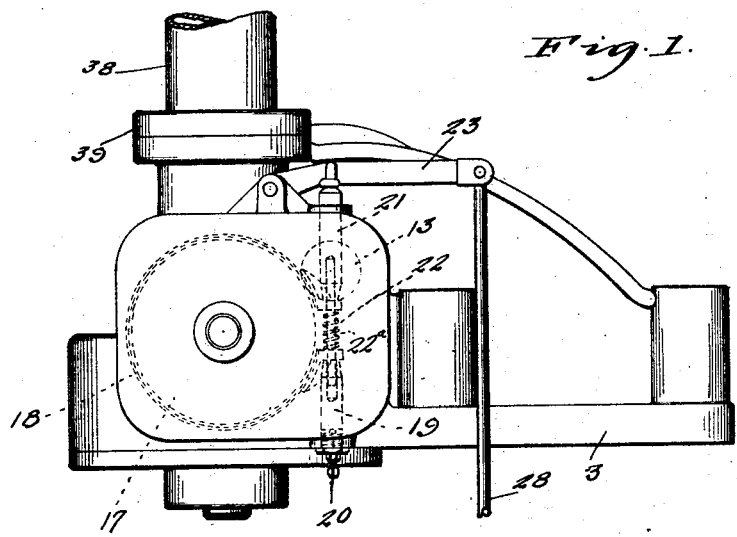
Figure 1 is a side view of the head portion of the press.
Figure 2:
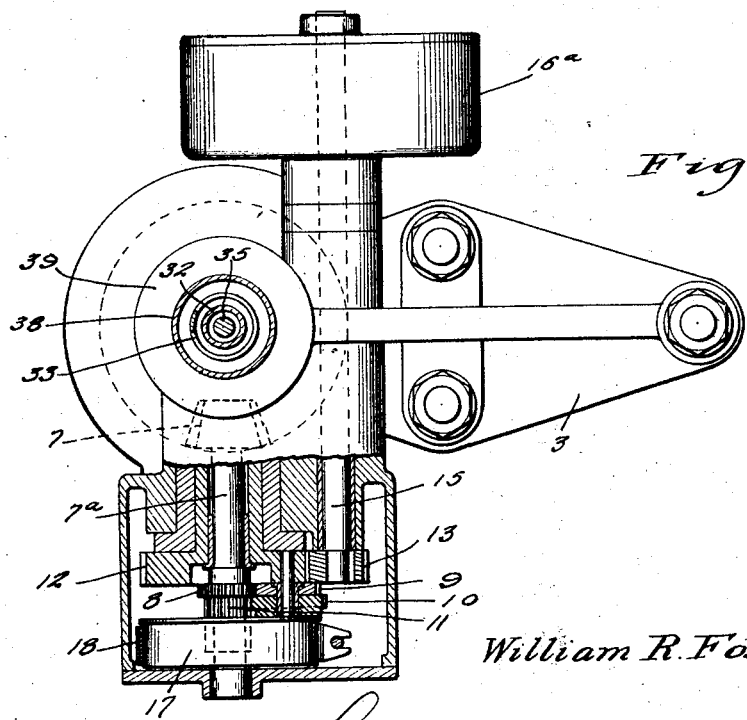
Fig. 2 is a plan view partly in section on line 2—2 of Fig. 3.
Figure 3:
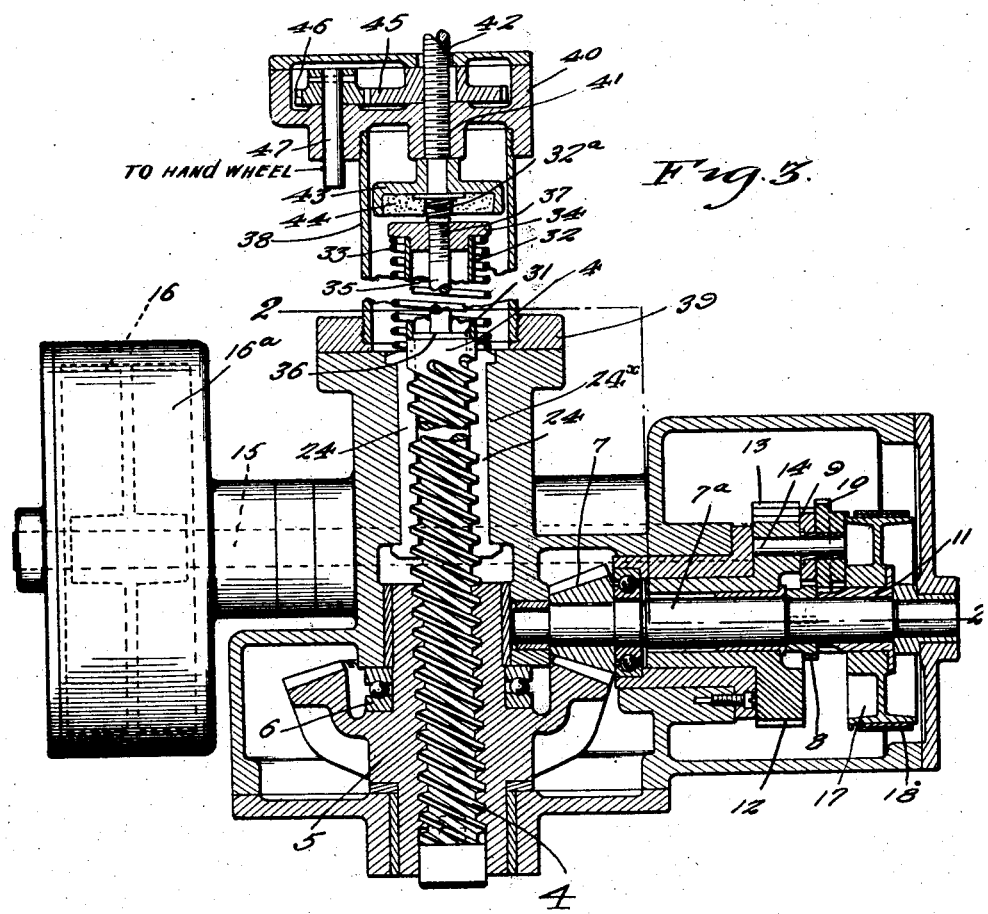
Fig. 3 is a vertical sectional view.
Figure 4:
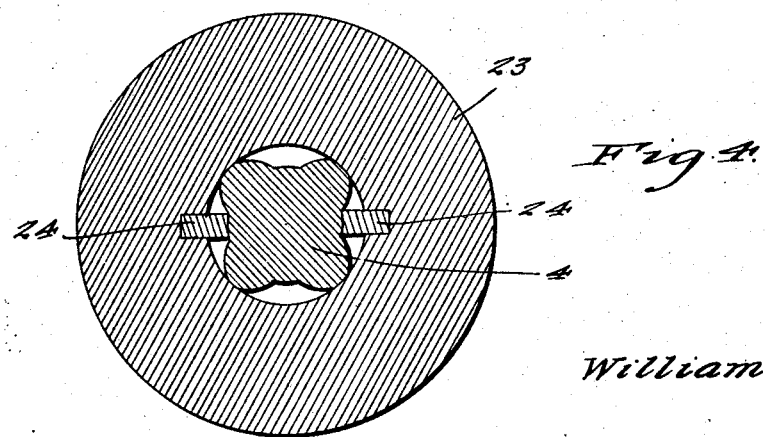
Fig. 4 is a view of a detail.

In these drawings 3 is the head of the press, 4 the ram provided with a coarse steep pitch screw thread. 5 is a nut having a thrust bearing at 6. It is provided with bevel gear teeth engaged by a bevel pinion 7 on shaft 7$^a$. Keyed to shaft 7$^a$ is the driven gear 8. This gear is driven by the planetary gear 9 of which there are three. Secured to planetary gear 9 is the driving planetary gear 10. These gears are either riveted together or preferably made of one piece and are carried on the three studs (14) one only of which is shown in Fig. 3.

These studs are riveted into the bull gear wheel 12 and of course revolve with it. The bull gear 12 is driven by the pinion 13 which is carried by the drive shaft 15 that is driven by the pulley 16 in casing 16$^a$. Means are provided to impart motion from the bull gear wheel 12, through the planetaries and gear 8 to the shaft 7$^a$ and thence through the pinion 7, and nut 5, to the ram 4 and this means is under control of the operator so that more or less of the bull wheels motion will be imparted to the ram.

For this purpose a drum 17, is mounted to turn freely on an extension of the shaft 7$^a$ to which the gear 8 is keyed to receive a brake band.

The brake band 18 is made to grip the drum more or less hard by operating a lever 23, from a suitable treadle through a rod 28.

One end of the brake band is secured to a plunger 19 which is mounted in the wall of the housing containing brake drum. This plunger is adjustable by means of a screw 20 to locate the band initially in proper relation to the drum and to compensate for wear.

Power from the lever 23 is transmitted to the other end of the brake by a plunger 21 and there is a spring 22 interposed between the ends of the brake band, and held in position by a rod 22$^a$.

When the band wheel or drum is free from restraint by the band the rotation of the bull wheel 12 will not impart any rotation to the shaft 7$^a$ and consequently the nut 5 will not rotate and will not move the screw threaded ram downwardly because the planetaries will simply roll around the gear 8 without imparting movement thereto, but will turn the band drum through its gear section 10 and the hub gear 11. If on the other hand the band wheel is restrained against rotation more or less by the band, the gear 8 will be rotated in a ratio proportionate to the difference in diameters and number of teeth of gears 9, 10, 11 and 8 and as gear 8 is fixed on shaft 7$^a$, this will turn shaft 7$^a$ and consequently the nut 5 will be turned to advance the screw ram downwardly. The screw ram is held from turning because it is splined or keyed to its stationary housing 24$^x$ by keys 24 fitting in grooves extending lengthwise of the screw.

On the upper end of the ram there is a shoulder turned at 31. Over this shoulder is fitted a piece of pipe 32. A spring 33 is carried on the outside of the pipe 32. This spring at its lower end presses on the top of the frame of the head and on the upper end contacts against a shouldered nut plate 34. A bolt 35 has its lower end attached to the top of the ram at 36 and its upper end screwed into the flanged nut at 37. This holds the spring under sufficient compression to overcome the weight of the ram and the friction of the gearing so that when the ram is released at the bottom of the stroke it moves quickly to the highest position allowed.

A large diameter pipe 38 is threaded into the plate 39 which plate is screwed onto the top of the head of the press.

Onto the top of the pipe 38 is screwed a cap 40. This cap is threaded at 41 to fit a splined screw 42. This screw at its lower end is pinned securely to a large disc 43 which has a recess in its lower face which is filled with a rubber bumper 44.

The cap 40 carries within it a gear and pinion 45, 46. The gear 45 is splined to and turns the screw 42. This gear is driven by the pinion 46 which is pinned to the shaft 47 which is connected by universal joint to a suitable hand wheel shaft so that by turning the hand wheel the rubber bumper or stop is raised or lowered which limits the upward travel of the ram.

The spring 33 returns the ram to its uppermost position when the pressure on the brake band is relieved by the operator.

There is also a spring 32ª placed in an opening in the stop 44, which bears upon the cap or nut plate 34 and takes a portion of the upward thrust of the ram and thus relieves the rubber 44 of some of the pressure.

The brake drum and gearing are run in oil contained in the casing which encloses them.

I claim:

1. In combination in a power press, a ram comprising a member having a screw threaded portion, a nut engaging the screw threaded portion of said member to move the ram axially to its work, means for rotating the nut, and means for restraining the screw threaded ram against rotary movement, said means for operating the nut comprising planetary drive gearing, a brake drum, a band for said drum and means manually operated for restraining the drum to render the gearing effective in driving the nut and advancing the ram in an axial direction.

2. In combination in a power press, a ram comprising a member having a screw threaded portion, a nut engaging the screw threaded portion of said member to move the ram axially to its work, means for rotating the nut, and means for restraining the screw threaded ram against rotary movement, said means for operating the nut comprising planetary drive gearing, a brake drum, a band for said drum and means manually operated for restraining the drum to render the gearing effective in driving the nut and advancing the ram in an axial direction, and means connected with the ram for returning it to normal position, substantially as described.

3. In combination, in a power press, a screw threaded ram, a frame, a spline connection between the ram and frame for holding the ram against rotary, but permitting it to have axial movement, a nut on the ram mounted in the frame to have rotary movement, gearing for driving said nut, and power means for driving the gearing manually operable means for determining when the power means will or will not drive the gearing, and means for applying power axially of the screw for returning it to its uppermost position when the manually operable means stops the transmission of power to the gear, substantially as described.

4. In combination in a power press, a screw threaded ram, a rotary nut for advancing the same in the direction of its axis, means for holding the screw threaded ram against rotary movement, a spring arranged above the ram and coaxially therewith, and means at the upper end of the spring bearing thereon and connected with the ram for lifting it, the lower end of said spring bearing on the frame, substantially as described.

5. In combination in a power press, a screw threaded ram, means for holding it against rotary movement, a nut with means for rotating the same for advancing the screw ram, means for lifting the ram from the work, a stop to limit the upward retracting movement of the ram and a spring at said stop to cushion the arresting action of the ram, substantially as described.

6. In combination in a power press, a ram, means for advancing the ram to its work including planetary gearing, and a brake drum and brake band for controlling the planetary gearing and means for operating the brake band comprising a lever and plunger, connected with one end thereof, a plunger connected with the other end, means for adjusting the latter plunger, and a spring between the ends of the brake band, said plungers being guided in the fixed casing, substantially as described.

In testimony whereof, I affix my signature.

WILLIAM R. FOX.